(12) United States Patent
Osawa

(10) Patent No.: US 6,901,218 B2
(45) Date of Patent: May 31, 2005

(54) PHOTOMETER, IMAGE SENSING DEVICE, PHOTOMETRIC METHOD, PROGRAM AND RECORDING MEDIUM

(75) Inventor: Toshifumi Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/665,756

(22) Filed: Sep. 19, 2003

(65) Prior Publication Data

US 2004/0190890 A1 Sep. 30, 2004

(30) Foreign Application Priority Data

Sep. 19, 2002 (JP) .................................. 2002-273252

(51) Int. Cl.[7] .......................... G03B 7/08; H04N 5/235; G01J 1/44
(52) U.S. Cl. .................... 396/234; 348/362; 356/222
(58) Field of Search ............................. 396/233, 234; 348/362–366; 356/222

(56) References Cited

U.S. PATENT DOCUMENTS 5,450,163 A * 9/1995 Iwasaki ...................... 396/234
5,703,644 A * 12/1997 Mori et al. .................. 348/363

FOREIGN PATENT DOCUMENTS

| JP | 06-225205 | 8/1994 | .......... H04N/5/238 |
| JP | 09-184965 | 7/1997 | ............ G02B/7/28 |
| JP | 11-190816 | 7/1999 | ............ G02B/7/28 |
| JP | 2002-296635 | 10/2002 | ............ G03B/7/08 |

OTHER PUBLICATIONS

English Abstract for JPA 2002–296635.
Partial Translation of JPA 2002–296635.
English Abstract for JPA 06–225205.
English Abstract for JPA 09–184965.
English Abstract for JPA 11–190816.

* cited by examiner

*Primary Examiner*—W. B. Perkey
(74) *Attorney, Agent, or Firm*—Morgan & Finnegan, LLP

(57) ABSTRACT

The present invention provides a photometer for making the photometry that can deal with various back light situations. For this purpose, a screen is two-dimensionally divided into plural areas, whereby one-dimensional projection data is calculated from the brightness data acquired from plural areas, and the maximum value of the calculated one-dimensional projection data is detected. Thus, the exposure compensation is made based on the detected maximum value.

12 Claims, 12 Drawing Sheets

F I G. 2
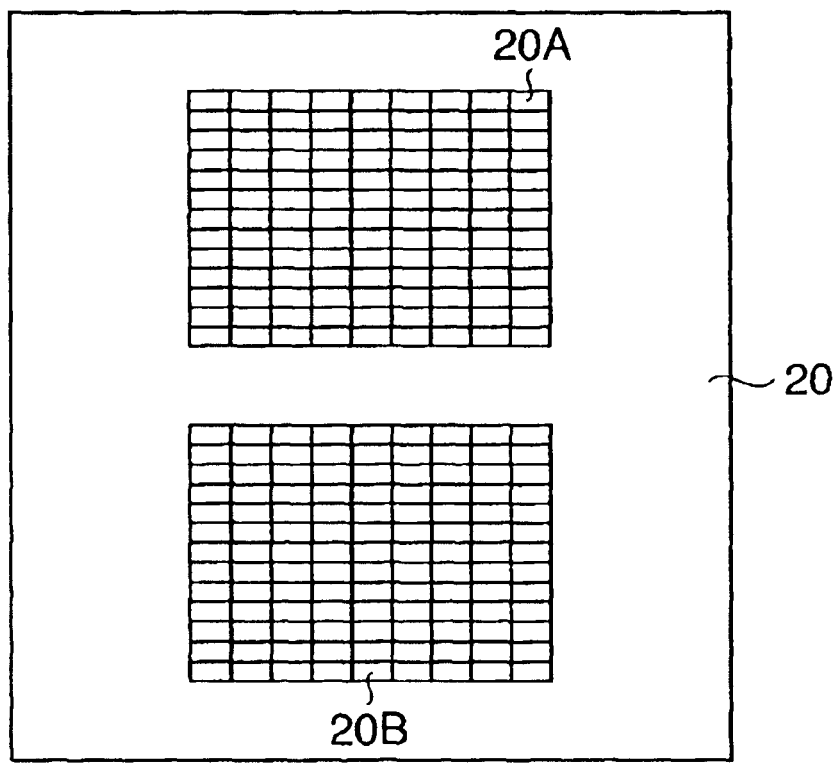

FIG. 3

| PD11 | PD12 | PD13 | PD14 | PD15 | PD16 | PD17 |
|------|------|------|------|------|------|------|
| PD21 | PD22 | PD23 | PD24 | PD25 | PD26 | PD27 |
| PD31 | PD32 | PD33 | PD34 | PD35 | PD36 | PD37 |
| PD41 | PD42 | PD43 | PD44 | PD45 | PD46 | PD47 |
| PD51 | PD52 | PD53 | PD54 | PD55 | PD56 | PD57 |

| ED11 | ED12 | ED13 | ED14 | ED15 | ED16 | ED17 | Y1 |
|------|------|------|------|------|------|------|----|
| ED21 | ED22 | ED23 | ED24 | ED25 | ED26 | ED27 | Y2 |
| ED31 | ED32 | ED33 | ED34 | ED35 | ED36 | ED37 | Y3 |
| ED41 | ED42 | ED43 | ED44 | ED45 | ED46 | ED47 | Y4 |
| ED51 | ED52 | ED53 | ED54 | ED55 | ED56 | ED57 | Y5 |

X1　X2　X3　X4　X5　X6　X7

| 10.5 | 10.7 | 10.9 | 11.0 | 11.0 | 10.7 | 10.5 | 10.8 |
| --- | --- | --- | --- | --- | --- | --- | --- |
| 9.9 | 10.0 | 10.9 | 11.0 | 10.8 | 9.7 | 9.5 | 10.5 |
| 8.7 | 8.5 | 8.1 | 9.0 | 8.2 | 7.5 | 8.0 | 8.5 |
| 7.9 | 7.5 | 6.7 | 7.8 | 7.9 | 7.2 | 7.5 | 7.6 |
| 6.9 | 7.0 | 6.8 | 7.0 | 7.1 | 6.8 | 6.8 | 7.0 |
| 8.8 | 8.7 | 8.7 | 9.2 | 9.0 | 8.4 | 8.5 | |

PHOTOMETER, IMAGE SENSING DEVICE, PHOTOMETRIC METHOD, PROGRAM AND RECORDING MEDIUM

FIELD OF THE INVENTION

The present invention relates to a photometer useful for an image sensing device such as a still camera or a video camera, the image sensing device, a photometric method, a program and a recording medium.

BACKGROUND OF THE INVENTION

For a photometer or an exposure control unit for the camera, a technique for correct exposure has been put to practical use in which a photographing screen is divided into plural areas to acquire a plurality of brightness information for the field, and it is discriminated whether or not a back light is present on the basis of the plurality of brightness information in accordance with a predetermined algorithm. In Japanese Patent Laid-Open No. 6-225205, such conventional technique was described. According to Japanese Patent Laid-Open No. 6-225205, the photographing screen is divided into a plurality of blocks, and the photometric value data is obtained from cumulative data for each block and the maximum value within the screen. Also, an iris control is made by changing a photometric reference value depending on whether a central part of the screen is a back light state or a follow light state, enabling the correct iris operation to be made for photographing under the back light condition. In Japanese Patent Laid-Open No. 6-225205, a video camera is taken as an example, in which the term of iris operation is used, but has the same meaning as the exposure control for the still camera to make the correct exposure for an image sensing element or film.

A typical example of the condition called back light is a situation where the brightness is low in a central part and a central lower part of the screen and high in other upper part and left and right parts of the screen, as shown in FIG. 3 of Japanese Patent Laid-Open No. 6-225205. In this situation, there is a high possibility of correct exposure by the conventional technique as described in Japanese Patent Laid-Open No. 6-225205. Examining a number of pictures taken under the back light condition, it does not always follow that the back light situation is the above situation where the brightness is low in a central part and a central lower part of the screen and high in other upper part and left and right parts of the screen. Thus, it has been found that there are various patterns, including a pattern where an upper part of the screen is only light and a pattern where a left part of the screen is only light, depending on the composition. For example, FIG. 10A shows one example of photographing composition, in which reference numeral 71 is a portrait area for the principal subject, 72 is a sky area, 73 is a ground area, 74 is a mountain area, and 75 to 77 are the tree areas. When this scene is in the back light, the sky area 72 among these areas has a high brightness, and other areas, particularly the portrait area 71 and the tree areas 75 to 77, have the low brightness. In this scene, an upper-part of the screen is only light, and the left and right parts of the principal subject are dark. Therefore, if this scene is photographed using a photometer as described in Japanese Patent Laid-Open No. 6-225205, it is often difficult to discriminate a back light, irrespective of the back light scene. Thereby, the picture was taken without making exposure compensation and producing the flash in accordance with the back light, and often collapsed black in the portrait area for the principal subject due to underexposure.

SUMMARY OF THE INVENTION

The present invention has been achieved in the background as described above, and it is an object of the invention to provide a photometer to make the exposure control for an image sensing device, the photometer comprising a photometric sensor being two-dimensionally divided into plural areas within a screen, in which one-dimensional data is calculated from the outputs of the photometric sensor, the maximum value of the one-dimensional data is detected, an exposure compensation value is calculated in accordance with the detected maximum value of the one-dimensional data, an average brightness value of the subject is calculated over the screen, and the exposure compensation value and the average brightness value are added to acquire a correct brightness value of the subject.

In a back light scene where only a part of the screen is light, the back light is adequately detected to make a correct exposure, thereby realizing the exposure control for the camera.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing a constitutional example of a focus detecting sensor;

FIG. 3 is a view showing a constitutional example of a photometric sensor;

FIG. 8 is a view showing the relationship between two-dimensional brightness data and one-dimensional projection data;

DETAILED DESCRIPTION OF THE PREFERRED EMBODIMENTS

The preferred embodiments of the present invention will be described below with reference to the accompanying drawings.

Figure 1:
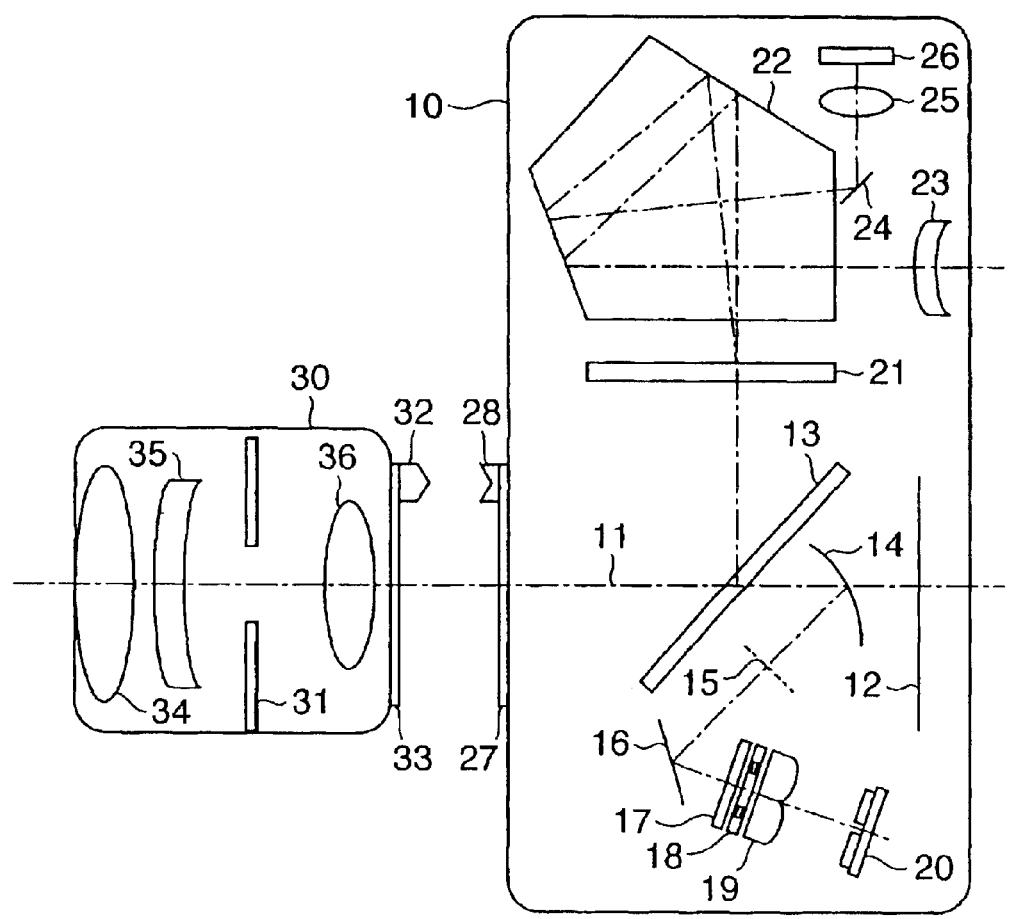
FIG. 1 is a cross-sectional view showing an arrangement of optical members for a camera and an interchangeable lens according to the present invention.

FIG. 1 is a cross-sectional view showing an arrangement of optical members for a camera according to the present invention.

In FIG. 1, the camera is a so-called single-lens reflex type in which the lens is interchangeable, in which reference numeral 10 is a camera main body and 30 is an interchangeable lens. In the camera main body 10, reference numeral 11 is an optical axis of a photographing lens, 12 is a film face, 13 is a semitransparent main mirror, and 14 is a first reflecting mirror, in which the main mirror 13 and the first reflecting mirror 14 are sprung up together at the time of photographing. Reference numeral 15 is a paraxial image formation face conjugate with the film face 12 by the first reflecting mirror 14, 16 is a second reflecting mirror, 17 is an infrared cut filter, 18 is a diaphragm having two openings, 19 is a secondary imaging lens, and 20 is a focus detecting sensor. The focus detecting sensor 20 is a photoelectric conversion element of area storage type such as a CMOS or a CCD, which comprises two pairs of photo sensors 20A and 20B having multiply divided areas, corresponding to two openings of the diaphragm 18, as shown in FIG. 2. In % addition to the photo sensors 20A and 20B, the peripheral circuits for signal storage and signal processing are composed of integrated circuits on the same chip. A mechanism from the first reflecting mirror 14 to the focus detecting sensor 20 enables the focus detection to be made based on an image drift at any position within the photographing screen, as described in detail in Japanese Patent Laid-Open No. 9-184965.

Reference numeral 21 is a focusing screen having diffusivity, 22 is a pentaprism, 23 is an ocular lens, 24 is a third reflecting mirror, 25 is a condensing lens, and 26 is a photometric sensor for acquiring the information regarding the brightness of the subject. The photometric sensor 26 consists of a photoelectric conversion element such as a silicon photodiode, in which a plurality of photo sensors are arranged like a lattice to contain the entire photographing screen in the field of view, as shown in FIG. 3. In this example, the field of view for receiving the light is divided into 7 columns×5 rows=35. The 35 divided photocells are referred to as PD11 to PD57. Besides the photo sensors, the peripheral circuits for signal amplification and signal processing are composed of integrated circuits on the same chip.

Figure 4:
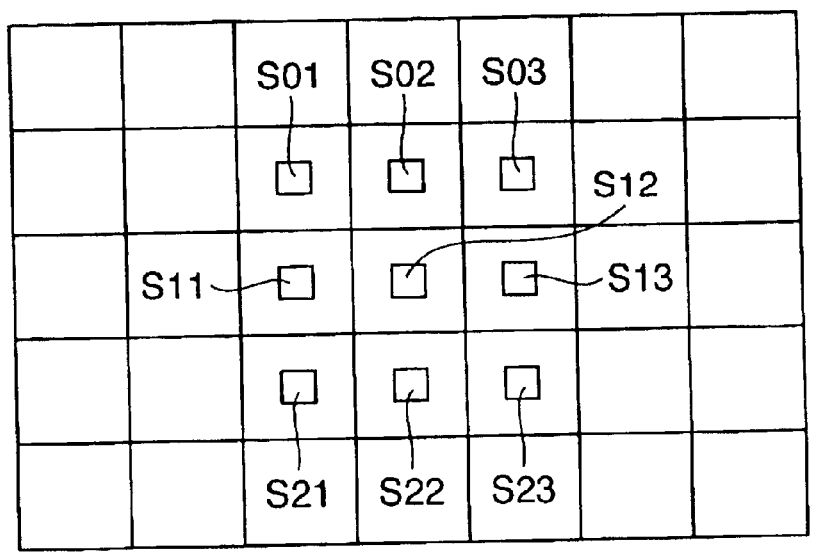
FIG. 4 is a view exemplifying focus detected positions on a photographing screen.

FIG. 4 is a view showing the positional relation of correspondence between the focus detected position by focus detecting means such as the focus detecting sensor 20 and the 35 divided photo sensors of the photometric sensor 26 within the photographing screen. In this example, there are nine focus detected positions S01 to S23 within the photographing screen, in which the focus detected position S01 corresponds to the photocell PD23 of the photometric sensor 26 to detect the focal point. Furthermore, the focus detecting position S02 corresponds to the photocell PD24 of the photometric sensor 26 to detect the focal point, the focus detecting position S03 corresponds to the photocell PD25 of the photometric sensor 26 to detect the focal point, and the focus detecting position S23 corresponds to the photocell PD45 of the photometric sensor 26 to detect the focal point, as shown in FIG. 4.

Reference numeral 27 is a mount portion for mounting the photographing lens, and 28 is a contact portion for communicating the information with the photographing lens. In the interchangeable lens 30, reference numeral 31 is a diaphragm, 32 is a contact portion for communicating the information with the camera main body, 33 is a mount portion to be mounted on the camera, and 34 to 36 are optical lenses making up the photographing lens.

Figure 5:
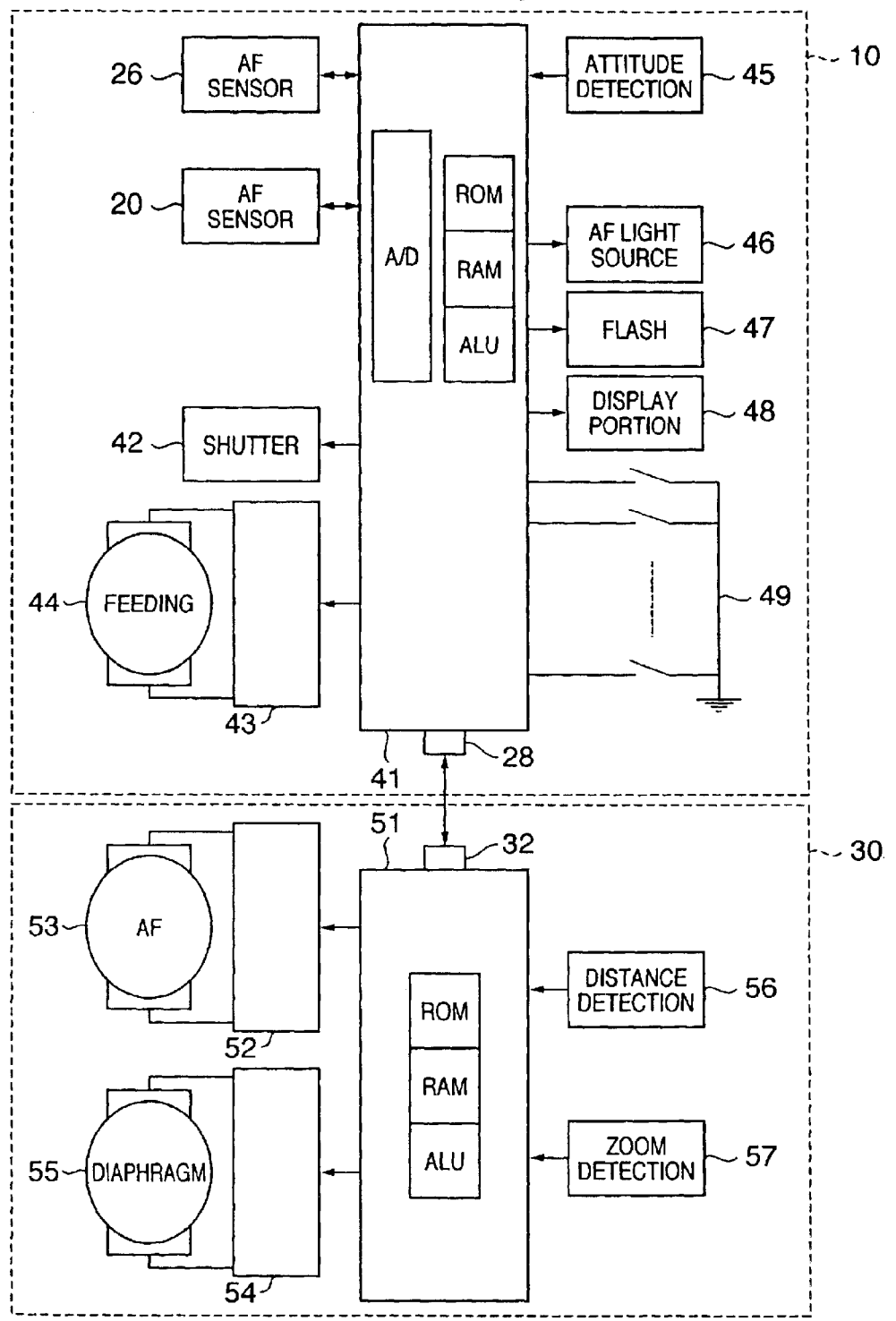
FIG. 5 is a block diagram showing a constitutional example of the electrical circuits for the camera and the interchangeable lens.

FIG. 5 is a block diagram showing a constitutional example of the electrical circuits for the camera main body 10 and its interchangeable lens 30 according to the invention. In the camera main body 10, reference numeral 41 is control means with a one-chip microcomputer comprising ALU, ROM, RAM, an A/D converter and a serial communication port internally to make the overall control of the camera mechanism. A specific sequence of the control means 41 will be described later. The focus detecting sensor 20 and the photometric sensor 26 are the same as those shown in FIG. 1. The output signals from the focus detecting sensor 20 and the photometric sensor 26 are connected to an input terminal of the A/D converter in the control means 41.

Reference numeral 42 is a shutter connected to an output terminal of the control means 41 and controlled. Reference numeral 43 is a first motor driver connected to the output terminal of the control means 41 and controlled, in which the first motor driver drives a first motor 44 for feeding the film or moving the main mirror 13.

Reference numeral 45 is a sensor for detecting the attitude of the camera, its output signal being connected to the input terminal of the control means 41. The control means 41 inputs the information of an attitude detecting sensor 45 to acquire the information as to whether the camera is held in the transverse or longitudinal position for photographing. Reference numeral 46 is an AF light source for emitting an infrared ray when the focus detection is made by the focusing sensor 20 under the condition of low illumination, in which the AF light source emits light in accordance with an output signal of the control means 41. Reference numeral 47 is flash means for producing the flash at the photographing time when the brightness of the subject is insufficient, in which flash means is excited in accordance with an output signal of the control means 41. Reference numeral 48 is a display for displaying the number of photographing sheets, the date and time, and the photographing information. The display is composed of a liquid crystal panel, and each indicator lamp is lighted in accordance with an output signal of the control means 41. Reference numeral 49 is various kinds of switches, including a release button. Reference numeral 28 is a contact portion as shown in FIG. 1 to which an input/output signal of the serial communication port in the control means 41 is connected.

In the interchangeable lens 30, reference numeral 51 is lens control means with a one-chip microcomputer comprising ALU, ROM, RAM and the serial communication port internally. Reference numeral 52 is a second motor driver for driving a second motor 53, which is connected to an output terminal of the lens control means 51 and controlled to make the focus adjustment. Reference numeral 54 is a third motor driver for driving a third motor 55, which is connected to the output terminal of the lens control means 51 and controlled to regulate the diaphragm 31, as shown in FIG. 1. Reference numeral 56 is a distance encoder for acquiring the information regarding an extension amount of focusing lens, namely a subject distance, the distance encoder being connected to an input terminal of the lens control means 51. Reference numeral 57 is a zoom encoder for acquiring the focal length information in photographing, when the interchangeable lens 30 is zoom lens, the zoom encoder being connected to the input terminal of the lens control means 51. Reference numeral 32 is the contact portion as shown in FIG. 1, to which an input/output signal of the lens control means 51 at the serial communication port is connected.

When the interchangeable lens 30 is mounted on the camera main body 10, the contact portions 28 and 32 are connected so that the lens control means 51 is enabled to make data communication with the control means 41 of the camera main body. The optical information intrinsic to the lens that is necessary for the control means 41 of the camera main body to make the focus detection or exposure operation, and the information regarding the subject distance or focal length based on the distance encoder 56 or the zoom encoder 57 are passed through the data communication from the lens control means 51 to the control means 41 of the camera main body. Also, the focusing information or diaphragm information that is obtained as a result of the focus detection or exposure operation made by the control means 41 of the camera main body is output through the data communication from the control means 41 of the camera main body to the lens control means 51, so that the lens control means 51 may control the second motor driver 52 in accordance with the focusing information and control the third motor driver 54 in accordance with the diaphragm information.

Figure 6:
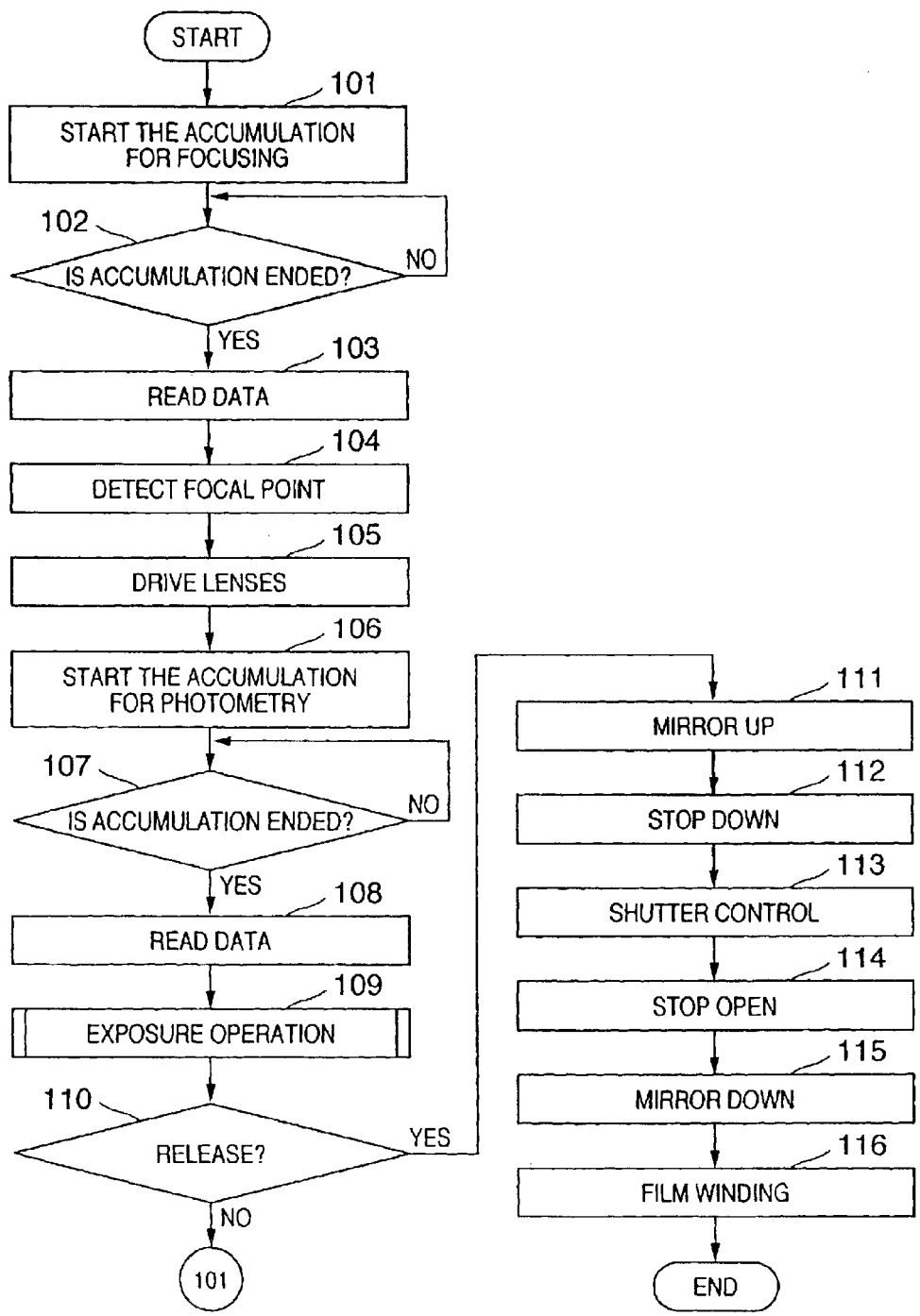
FIG. 6 is a flowchart showing the operation of control means for the camera.

Referring to the flowcharts of FIG. 6 and beyond, a specific operation sequence of the control means 41 in the camera main body according to the invention will be described below. If a power switch, not shown, is turned on, the control means 41 becomes operable. If a first stroke switch of the release button, not shown, is turned on, the operation starts at step (101) in FIG. 6.

(101) Start signal accumulation by issuing a control signal to the focus detecting sensor 20.

(102) Wait for the focus detecting sensor 20 to end the signal accumulation.

(103) Read the signal accumulated in the focus detecting sensor 20 and make the A/D conversion. Moreover, various kinds of necessary data correction including the shading are performed for read digital data.

(104) Input the lens information necessary for focus detection from the lens control means 51, and calculate the focus state in each part of the photographing screen based on the input lens information and digital data obtained from the focus detecting sensor 20. An area for focusing within the screen is decided in accordance with the calculated focus state in each part within the photographing screen by a method as described in Japanese Patent Laid-Open No. 11-190816. The lens movement amount of moving the lens into focus is calculated in accordance with the focus state in the decided area.

(105) Output the calculated lens movement amount to the lens control means 51. Accordingly, the lens control means 51 sends a signal to the second motor driver 52 for driving the second motor 53 to adjust the focusing lens. Thereby, the photographing lens is placed in a focused state for the subject. After the focused state, the information regarding the subject distance from the distance encoder 56 is input by the lens control means 51 to acquire the distance information to the subject.

(106) Start the signal accumulation by sending a control signal to the photometric sensor 26.

(107) Wait for the photometric sensor 26 to end the signal accumulation.

(108) Read the signal of each photocell PD11 to PD57 accumulated in the photometric sensor 26 and make the A/D conversion.

(109) Make the exposure operation. The brightness of the subject is obtained by arithmetical operation, so that the shutter speed and the stop value for correct exposure are decided. Also, a discrimination whether or not the scene is the back light scene is made according to a predetermined algorithm. Also, a discrimination whether or not to produce the flash is made. The details of the operation contents will be described later with reference to the flowchart of FIG. 7.

(110) Wait for the second stroke switch of the shutter button to be turned on. If it is not turned on, the procedure returns to step (101). However, if it is turned on, the procedure proceeds to step (111).

(111) Spring up the main mirror 13 and the first reflecting mirror 14 by sending a control signal to the first motor driver for driving the first motor 44.

(112) Forward the diaphragm value information calculated at step (109) to the lens control means 51. Based on this information, the lens control means 51 outputs a control signal to the third motor driver 54 for driving the third motor 55 to move the diaphragm 31. Thereby, the photographing lens becomes in a stopped-down state.

(113) Control the shutter 42 according to the shutter speed calculated at step (109) to expose the film. By an exposure operation as will be described in detail later, if it is determined that the scene is to be photographed employing the flash means 47, the flash means 47 is excited.

(114) Open the diaphragm by forwarding the information to the lens control means 51. Based on this information, the lens control means 51 sends a control signal to the third motor driver 54 for driving the third motor 55 to move the diaphragm 31. Thereby, the photographing lens becomes in a stop open state.

(115) Spring back the main mirror 13 and the reflecting mirror 14 down by sending a control signal to the first motor driver for driving the first motor 44.

(116) Wind up the film by sending a control signal to the first motor driver for driving the first motor 44.

Thus, a series of photographing sequence is completed.

Referring now to the flowchart of FIG. 7, the detailed contents of the exposure operation at step (109) will be described.

(151) Input the lens information necessary for exposure operation from the lens control means 51 and correct the digital brightness data obtained from the photocells PD11 to PD57 of the photometric sensor 26 at step (108). The brightness data corresponding to photocells PD11 to PD57 after correction are referred to as ED11 to ED57, respectively. Moreover, the attitude information of the camera is acquired by inputting the information of the attitude detecting sensor 45.

(152) Calculate the projection data Y1 to Y5 and X1 to X7 based on the corrected brightness data ED11 to ED57 of the photocells. When the projection data Y1 to Y5 are calculated, the calculation range of projection data is changed according to the information of the area where the focus detection is made at step (104). Referring now to FIG. 8, a specific calculation method will be described. Generally, a method for transforming the two dimensional array of m rows×n columns to one dimensional array with data added or added and averaged in the row or column direction is called a projection or a projective transformation from two dimensions to one dimension. Also, one dimensional array data resulted from the addition in the row or column direction is called a projected image or projection data. In this embodiment, the projection data Y1 to Y5 and X1 to X7 are calculated from the two dimensional brightness information ED11 to ED57 according to the array of photocells PD11 to PD57 in the photometric sensor 26. For the projection data X1 to X7, the calculation method is fixed, irrespective of the focus detecting position information.

$$X1=(ED11+ED21+ED31+ED41+ED51)\div 5$$

$$X2=(ED12+ED22+ED32+ED42+ED52)\div 5$$

$$X3=(ED13+ED23+ED33+ED43+ED53)\div 5$$

$$X4=(ED14+ED24+ED34+ED44+ED54)\div 5$$

$$X5=(ED15+ED25+ED35+ED45+ED55)\div 5$$

$$X6=(ED16+ED26+ED36+ED46+ED56)\div 5$$

$$X7=(ED17+ED27+ED37+ED47+ED57)\div 5$$

For the projection data Y1 to Y5, the calculation data range is changed depending on the focus detecting position information in the following way. Since the focus detecting position is fundamentally considered to be the position of the principal subject, the exposure operation is made by weighting the 5×5 area including the position of principal subject as the principal photometric area with higher value or feature.

When the focus detecting position is S01, S11 or. S21 in FIG. 4, $$Y1=(ED11+ED12+ED13+ED14+ED15)\div 5$$

$$Y2=(ED21+ED22+ED23+ED24+ED25)\div 5$$

$$Y3=(ED31+ED32+ED33+ED34+ED35)\div 5$$

$$Y4=(ED41+ED42+ED43+ED44+ED45)\div 5$$

$$Y5=(ED51+ED52+ED53+ED54+ED55)\div 5$$

When the focus detecting position is S02, S12 or S22 in FIG. 4, $$Y1=(ED12+ED13+ED14+ED15+ED16)\div 5$$

$$Y2=(ED22+ED23+ED24+ED25+ED26)\div 5$$

$$Y3=(ED32+ED33+ED34+ED35+ED36)\div 5$$

$$Y4=(ED42+ED43+ED44+ED45+ED46)\div 5$$

$$Y5=(ED52+ED53+ED54+ED55+ED56)\div 5$$

When the focus detecting position is S03, S13 or S23 in FIG. 4, $$Y1=(ED13+ED14+ED15+ED16+ED17)\div 5$$

$$Y2=(ED23+ED24+ED25+ED26+ED27)\div 5$$

$$Y3=(ED33+ED34+ED35+ED36+ED37)\div 5$$

$$Y4=(ED43+ED44+ED45+ED46+ED47)\div 5$$

$$Y5=(ED53+ED54+ED55+ED56+ED57)\div 5$$

(153) Calculate the average brightness value Ea over the entire screen in which the area farther away from the focus detecting position is weighted with lower value by emphasizing the focus detecting position according to the information of focus detecting position.

When the focus detecting position is S01 in FIG. 4, $$Ea=\{(X1+X2+X3+X4+X5)\times 5+(X6+X7)\times 2.5+ED23\times 5\}\div 35$$

When the focus detecting position is S02 in FIG. 4, $$Ea=\{(X2+X3+X4+X5+X6)\times 5+(X1+X7)\times 2.5+ED24\times 5\}\div 35$$

When the focus detecting position is S03 in FIG. 4, $$Ea=\{(X3+X4+X5+X6+X7)\times 5+(X1+X2)\times 2.5+ED25\times 5\}\div 35$$

When the focus detecting position is S11 in FIG. 4, $$Ea=\{(X1+X2+X3+X4+X5)\times 5+(X6+X7)\times 2.5+ED33\times 5\}\div 35$$

When the focus detecting position is S12 in FIG. 4, $$Ea=\{(X2+X3+X4+X5+X6)\times 5+(X1+X7)\times 2.5+ED34\times 5\}\div 35$$

When the focus detecting position is S13 in FIG. 4, $$Ea=\{(X3+X4+X5+X6+X7)\times 5+(X1+X2)\times 2.5+ED35\times 5\}\div 35$$

When the focus detecting position is S21 in FIG. 4, $$Ea=\{(X1+X2+X3+X4+X5)\times 5+(X6+X7)\times 2.5+ED43\times 5\}\div 35$$

When the focus detecting position is S22 in FIG. 4, $$Ea=\{(X2+X3+X4+X5+X6)\times 5+(X1+X7)\times 2.5+ED44\times 5\}\div 35$$

When the focus detecting position is S23 in FIG. 4, $$Ea=\{(X3+X4+X5+X6+X7)\times 5+(X1+X2)\times 2.5+ED45\times 5\}\div 35$$

Figure 9:
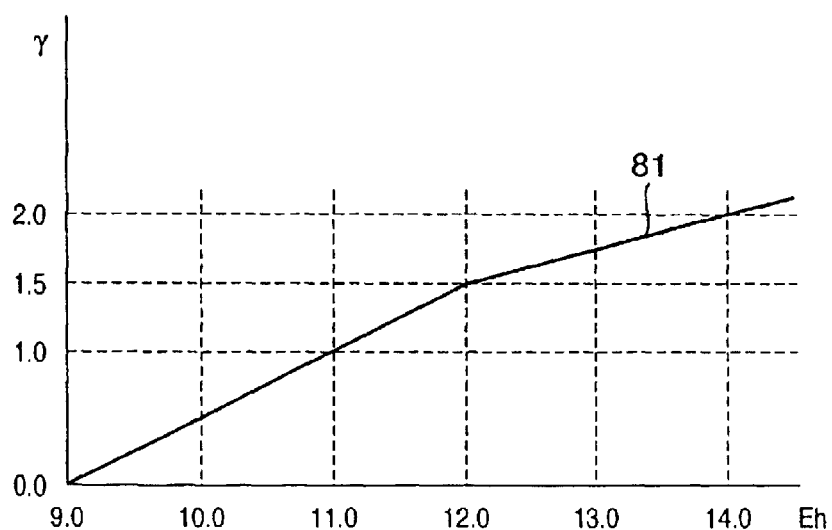
FIG. 9 is an explanatory graph representing the high brightness correction value.

(154) Detect the maximum value among the projection data Y1 to Y5 and X1 to X7. The maximum value is denoted as Eh. When Eh is greater than a predetermined value, the high brightness correction value $\gamma$ is calculated. The relationship between the maximum value Eh and the high brightness correction value $\gamma$ is indicated by a line 81 in FIG. 9. The line 81 in FIG. 9 represents a graph for calculating the high brightness correction value $\gamma$, when Eh is greater than 9 in the Bv value. For example, $\gamma=1.5$ for Eh=12, and $\gamma=2$ for Eh=14. In the case of Eh=9, $\gamma=0$. If the high brightness correction value $\gamma$ is calculated, the average brightness value Ea calculated at previous step is corrected for high brightness to obtain Ea($\gamma$).

$$Ea(\gamma)=Ea-\gamma$$

When the maximum value among the projection data Y1 to Y5 and X1 to X7 satisfies the following condition, the value indicated by the line 81 of FIG. 9 that is multiplied by 0.5 is defined as $\gamma$.

The condition includes when the focus detecting position is S01, S11 or S21 in FIG. 4 and the maximum value among the projection data is X6 or X7, when the focus detecting position is S02, S12 or 522 in FIG. 4 and the maximum value among the projection data is X1 or X7, or when the focus detecting position is S03, S13 or S23 in FIG. 4 and the maximum value among the projection data is X1 or X2. Under this condition, since the maximum value detecting area has a lower weight, when the average brightness value Ea is calculated at step (153), it is necessary that the high brightness correction value $\gamma$ is reduced.

Figures 10A, 10B:
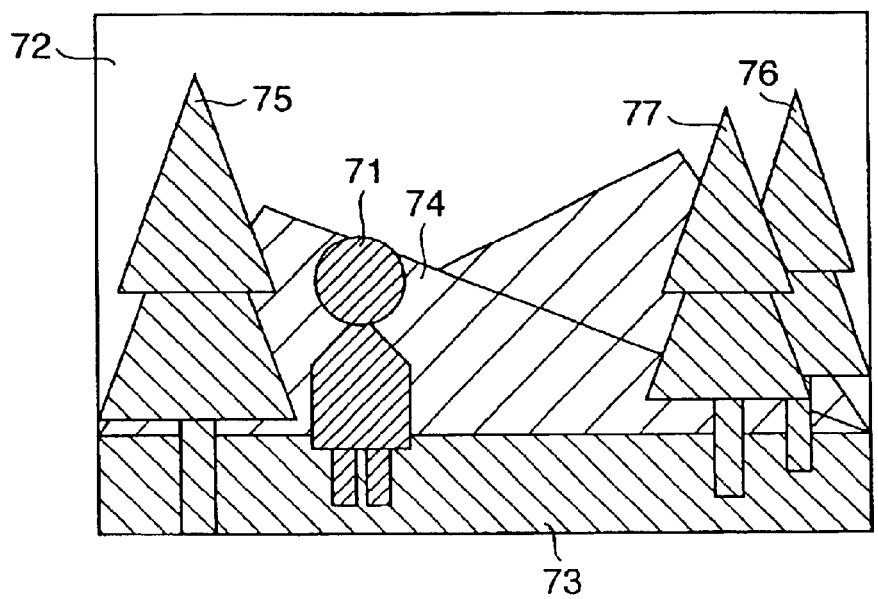
FIGS. 10A and 10B are views showing a photographing screen and a table exemplifying the brightness data.

By making the high brightness correction in this manner, when a high brightness area in the back light sky is included in the screen, it is possible to correct for the influence of brightness value in the high brightness area. One example will be taken in connection with FIGS. 10A and 10B. The brightness information ED11 to ED57 corresponding to a scene of FIG. 10A and the calculated projection data Y1 to Y5 and X1 to X7 are represented as numerical values in FIG. 10B in accordance with the array of FIG. 8. In this scene, since it is appropriate to make the focus detection near the face of the portrait 71 as the principal subject, the focus detecting position is S11, whereby Ea=8.7. Since the maximum brightness among the projection data is 10.8 at Y1, Eh=10.8, and $\gamma=0.9$ results from FIG. 9.

Accordingly, Ea($\gamma$)=Ea$-\gamma$=7.8. If the exposure of the camera is decided in accordance with Ea($\gamma$), the exposure value suitable for photographing the portrait, trees and mountains is obtained by removing the influence of the sky portion on the upper part of the screen.

(155) Calculate a gradient value ΔE of brightness in the top and bottom direction within the photographing screen on the basis of the calculated projection data, camera attitude data and focus detecting position information.

When the camera attitude is in the transverse normal position, photocells PD11 to PD17 of the photometric sensor 26 are on the top side of the screen, and photocells PD51 to PD57 are on the bottom side of the screen. Hence, the gradient value ΔE of brightness is calculated in accordance with the following expression.

$$E=\{(Y1+Y2)/2-(Y4+Y5)/2\}/3$$

When the camera attitude is in the longitudinal position, photocells PD11 to PD51 of the photometric sensor 26 are on the top side of the screen, and photocells PD17 to PD57 are on the bottom side of the screen, the gradient value ΔE of brightness is calculated on the basis of the focus detecting position information. When the focus detecting position is S01, S11 or S21 in FIG. 4, $$\Delta E=\{(X1+X2)/2-(X4+X5)/2\}/3$$

When the focus detecting position is S02, S12 or S22 in FIG. 4, $$\Delta E=\{(X2+X3)/2-(X5+X6)/2\}/3$$

When the focus detecting position is S03, S13 or S23 in FIG. 4, $$\Delta E=\{(X3+X4)/2-(X6+X7)/2\}/3$$

When the camera attitude is in the longitudinal position, photocells PD17 to PD57 of the photometric sensor 26 are on the top side of the screen, and photocells PD11 to PD51 are on the bottom side of the screen, the gradient value ΔE of brightness is calculated on the basis of the focus detecting position information in accordance with the following expression.

When the focus detecting position is S01, S11 or S21 in FIG. 4, $$\Delta E=\{(X4+X5)/2-(X1+X2)/2\}/3$$

When the focus detecting position is S02, S12 or S22 in FIG. 4, $$\Delta E=\{(X5+X6)/2-(X2+X3)/2\}/3$$

When the focus detecting position is S03, S13 or S23 in FIG. 4, $$\Delta E=\{(X6+X7)/2-(X3+X4)/2\}/3$$

The meaning of the calculated gradient value ΔE of brightness is the numerical value simply indicating the average change rate of brightness in the top and bottom direction for each row (column) in the 5×5 area near the focus detecting position within the photographing screen.

(156) Calculate a deviation γEs between the calculated average brightness value Ea(γ) corrected for high brightness and the brightness value Es at the focus detecting position.

$$\Delta Es=Ea(\gamma)-Es$$

Herein, Es is equal to ED23 (when the focus detecting position is S01), ED24 (when the focus detecting position is S02), ED25 (when the focus detecting position is S03), ED33 (when the focus detecting position is S11), ED34 (when the focus detecting position is S12), ED35 (when the focus detecting position is S13), ED43 (when the focus detecting position is S21), ED44 (when the focus detecting position is S22), or ED45 (when the focus detecting position is S23).

Figure 11:
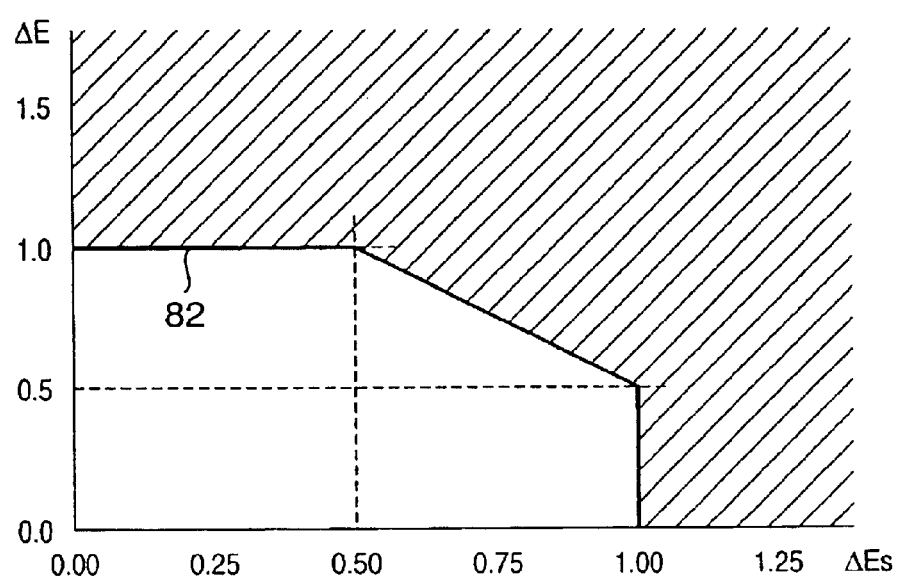
FIG. 11 is an explanatory graph representing the flash producing condition.

(157) Discriminate whether or not the flash means 47 should be employed to photograph the scene. The condition for employing the flash means 47 to photograph the scene is either the first condition that the calculated average brightness value Ea(γ) corrected for high brightness is lower than a predetermined brightness (e.g., below 5 in Bv value) or the second condition that the calculated gradient value ΔE of brightness and the deviation ΔEs are positive with their relation being outside a line 82 as represented in FIG. 11 (hatched portion). When any of the gradient value ΔE of brightness and the deviation ΔEs is negative, the flash is not produced.

Also, when it is obvious that the distance to the subject is far and the excellent photographed results are not obtained with the light quantity of the provided flash means 47 as a result of focusing the photographing lens at step (105), the flash means 47 may not be employed, even if the first or second condition is satisfied. Also, when the camera is not in a photographing mode for automatically employing the flash means, it is unnecessary to perform this step. When it is discriminated that the flash means 47 should be employed to photograph the scene, the flash means 47 is prepared to produce the flash.

(158) Calculate the exposure compensation value α when the predetermined condition is satisfied.

When Ea(γ)>Es and the flash means is not employed as the condition, $$\alpha=\{Es-Ea(\gamma)\}\times 0.5$$

When Ea(γ)<Es and Ea(γ)<0 as the condition, $$\alpha=\{Es-Ea(\gamma)\}\times 0.25$$

Under other conditions, α=0.

(159) Calculate the subject brightness value for exposure control as Ee=Ea(γ)+α. In this expression, α={Es−Ea(γ)}×0.5, whereby Ee=(Ea(γ)+Es)×0.5. Also, Ea(γ)=Ea−γ, whereby Ee=(Ea−γ+Es)×0.5.

The optimal exposure control factors, namely the shutter speed and the stop value, are decided on the basis of the subject brightness value Ee and the presence or absence of employing the flash means 47 that is discriminated at step (157).

The above is the detailed description for the exposure operation. Though in this embodiment, the photometric sensor is divided into 5×7 or 35 photocells, and the number of focus detecting positions is 9, the invention is not limited to this case.

The description of the first embodiment is thus completed.

[Second Embodiment]

In the first embodiment, the photocells of the photometric sensor 26 are arranged in the two-dimensional array of m rows×n columns. However, other than the photometric sensor 26 as above, a photometer having the same back light detecting effect can be realized as follows.

Figure 12A:
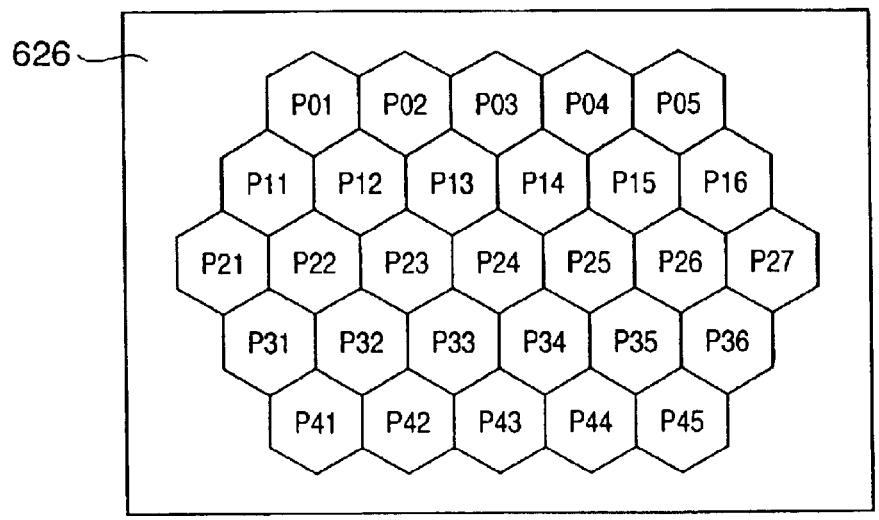
FIGS. 12A and 12B are views showing a constitutional example of a photometric sensor according to a second embodiment of the invention.

FIG. 12A is a view showing the photocells of a second photometric sensor 626, instead of the photometric sensor 26 in the first embodiment. As shown in FIG. 12A, the second photometric sensor 626 are divided into 29 photocells P01 to P45 arranged like a swage block, each photocell having a hexagonal shape.

Figure 12B:
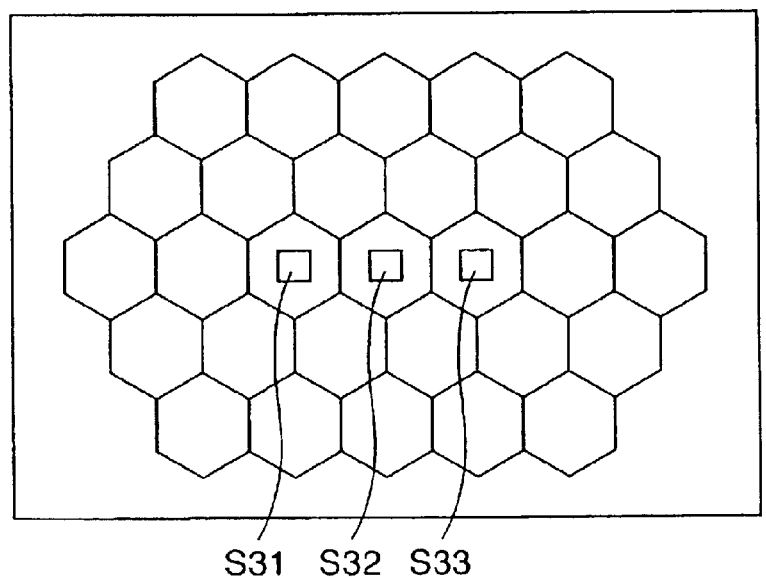

Also, FIG. 12B is a view showing three focus detecting positions S31 to S33 in the second embodiment, in which the focus detecting position S31 corresponds to the photocell P23 of the photometric sensor 626 to make the focus detection, the focus detecting position S32 corresponds to the photocell P24 of the photometric sensor 626 to make the focus detection, and the focus detecting position S33 corresponds to the photocell P25 of the photometric sensor 626 to make the focus detection. Other constitution is not different from the first embodiment as shown in FIG. 1 or 5. Also, the overall flowchart as shown in FIG. 6 in the first embodiment is employed in the first embodiment.

Figure 7:
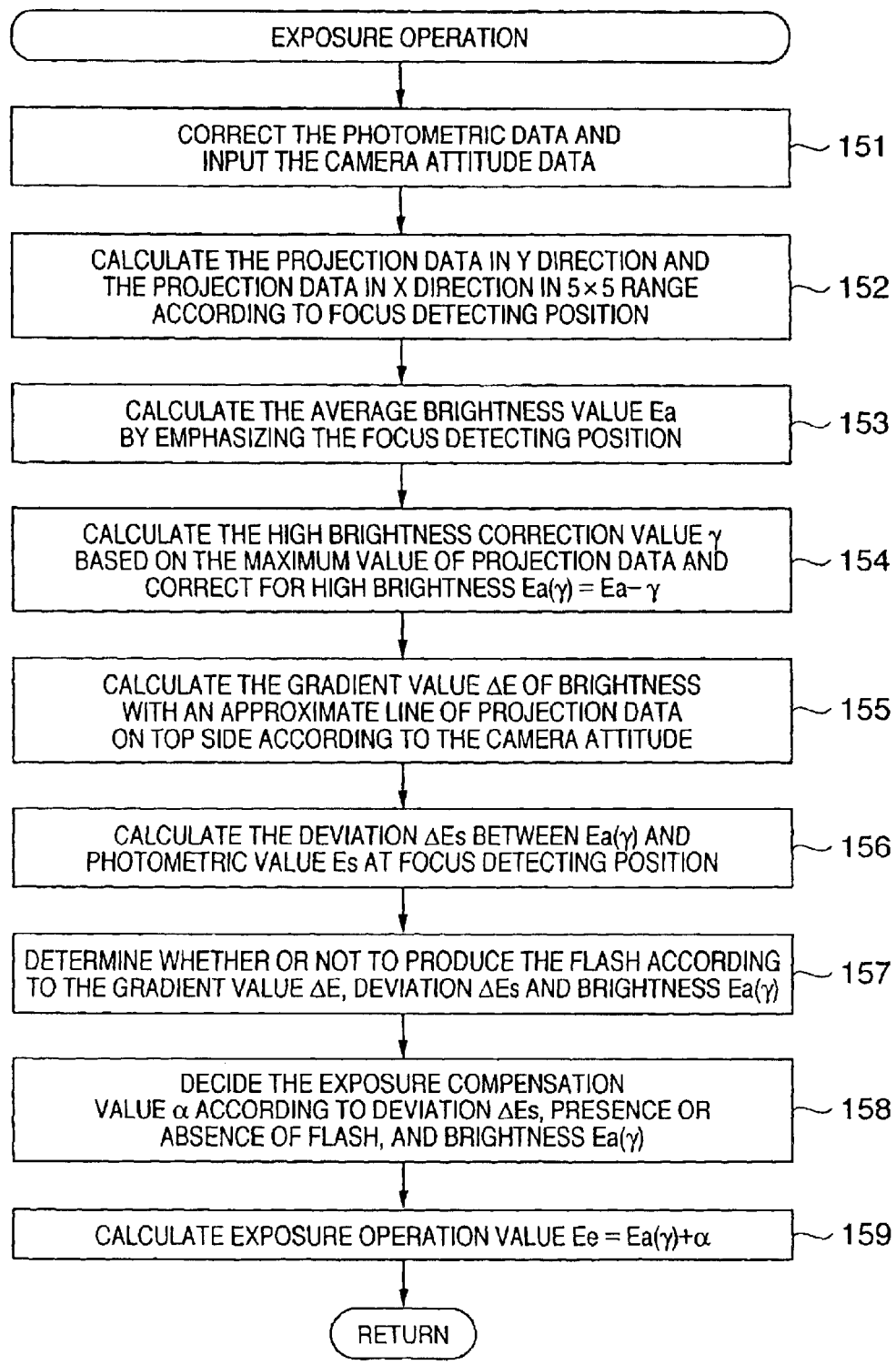
FIG. 7 is a flowchart showing the operation of the control means for the camera in conjunction with FIG. 6.

A part of the exposure operation as shown in FIG. 7 is different from the first embodiment, and will be described below.

(151) Input the lens information necessary for exposure operation from the lens control means 51 and correct the digital brightness data obtained from the photocells P01 to P45 of the second photometric sensor 626 at step (108). The brightness data corresponding to photocells P01 to P45 after correction are referred to as E01 to E45, respectively. Moreover, the attitude information of the camera is acquired by inputting the information of the attitude detecting sensor 45.

(152) Calculate the one-dimensional data Y1 to Y5 and X1 to X7 based on the corrected brightness data E01 to E45 of the photocells. When the one-dimensional data Y1 to Y5 are calculated, the calculation range of one-dimensional data is changed according to the information of the area where the focus detection is made at step (104). A specific calculation method will be described.

For the one-dimensional data X1 to X7, the calculation method is fixed, irrespective of the focus detecting position information.

$$X1=(E21\times2+E11+E31)+4$$

$$X2=(E01\times2+E22\times2+E41\times2+E11+E12+E31+E32)+10$$

$$X3=(E02\times2+E23\times2+E42\times2+E12+E13+E32+E33)+10$$

$$X4=(E03\times2+E24\times2+E43\times2+E13+E14+E33+E34)+10$$

$$X5=(E04\times2+E25\times2+E44\times2+E14+E15+E34+E35)+10$$

$$X6=(E05\times2+E26\times2+E45\times2+E15+E16+E35+E36)+10$$

$$X7=(E27\times2+E16+E36)+4$$

For the one-dimensional data Y1 to Y5, the calculation data range is changed depending on the focus detecting position information in the following way. Since the focus detecting position is fundamentally considered to be the position of the principal subject, the exposure operation is made by weighting the 5×5 area including the position of principal subject as the principal photometric area with higher value or feature.

When the focus detecting position is S31 in FIG. 12B, $$Y1=(E01+E02+E03+E04+E05)\div5$$

$$Y2=(E11+E12+E13+E14+E15)\div5$$

$$Y3=(E21+E22+E23+E24+E25)\div5$$

$$Y4=(E31+E32+E33+E34+E35)\div5$$

$$Y5=(E41+E42+E43+E44+E45)\div5$$

When the focus detecting position is S32 in FIG. 12B, $$Y1=(E01+E02+E03+E04+E05)\div5$$

$$Y2=(E11\times0.5+E12+E13+E14+E15+E16\times0.5)\div5$$

$$Y3=(E22+E23+E24+E25+E26)\div5$$

$$Y4=(E31\times0.5+E32+E33+E34+E35+E36\times0.5)\div5$$

$$Y5=(E41+E42+E43+E44+E45)\div5$$

When the focus detecting position is S33 in FIG. 12B, $$Y1=(E01+E02+E03+E04+E05)\div5$$

$$Y2=(E12+E13+E14+E15+E16)\div5$$

$$Y3=(E23+E24+E25+E26+E27)\div5$$

$$Y4=(E32+E33+E34+E35+E36)\div5$$

$$Y5=(E41+E42+E43+E44+E45)\div5$$

(153) Calculate the average brightness value Ea over the entire screen in which the area farther away from the focus detecting position is weighted with lower value by emphasizing the focus detecting position according to the information of focus detecting position.

When the focus detecting position is S31 in FIG. 12B, $$Ea=\{X1\times2+(X2+X3+X4+X5)\times5+X6\times2.5+X7+E23\times3.5\}\div29$$

When the focus detecting position is S32 in FIG. 12B, $$Ea=\{(X2+X3+X4+X5+X6)\times5+X1+X7+E24\times2\}\div29$$

When the focus detecting position is S33 in FIG. 12B, $$Ea=\{(X3+X4+X5+X6)\times5+X7\times2+X2\times2.5+X1+E25\times3.5\}\div29$$

(154) Detect the maximum value among the one-dimensional data Y1 to Y5 and X1 to X7. The maximum value is denoted as Eh. When Eh is greater than a predetermined value, the high brightness correction value γ is calculated. The relationship between the maximum value Eh and the high brightness correction value γ is indicated by the line 81 in FIG. 9 as in the first embodiment. If the high brightness correction value γ is calculated, the average brightness value Ea calculated at previous step is corrected for high brightness to obtain Ea(γ).

$$Ea(\gamma)=Ea-\gamma$$

When the maximum value among the one-dimensional data Y1 to Y5 and X1 to X7 satisfies the following condition, the value indicated by the line 81 of FIG. 9 that is multiplied by 0.5 is defined as y.

The condition includes when the focus detecting position is S31 in FIG. 12B and the maximum value among the one-dimensional data is X6 or X7, when the focus detecting position is S32 in FIG. 12B and the maximum value among the one-dimensional data is X1 or X7, or when the focus detecting position is S33 in FIG. 12B and the maximum value among the one-dimensional data is X1 or X2. In the case where the maximum value detecting area has the lower weight in calculating the average brightness value Ea at step (153) as in the first embodiment, the high brightness correction value γ is reduced.

(155) Calculate a gradient value ΔE of brightness in the top and bottom direction within the photographing screen on the basis of the calculated projection data, camera attitude data and focus detecting position information.

When the camera attitude is in the transverse normal position, the gradient value ΔE of brightness is calculated in accordance with the following expression.

$$\Delta E=\{(Y1+Y2)/2-(Y4+Y5)/2\}/3$$

When the camera attitude is in the longitudinal position, photocell P21 of the photometric sensor 626 is on the top side of the screen, and the photocell P27 is on the bottom side of the screen, the gradient value ΔE of brightness is calculated on the basis of the focus detecting position information.

When the focus detecting position is S31 in FIG. 12B, $$\Delta E = \{(X1+X2)/2 - (X4+X5)/2\}/3$$

When the focus detecting position is S32 in FIG. 12B, $$\Delta E = \{(X2+X3)/2 - (X5+X6)/2\}/3$$

When the focus detecting position is S33 in FIG. 12B, $$\Delta E = \{(X3+X4)/2 - (X6+X7)/2\}/3$$

When the camera attitude is in the longitudinal position, the photocell P27 of the photometric sensor 626 is on the top side of the screen, and the photocell P21 is on the bottom side of the screen, the gradient value ΔE of brightness is calculated on the basis of the focus detecting position information in accordance with the following expression.

When the focus detecting position is S31 in FIG. 12B, $$\Delta E = \{(X4+X5)/2 - (X1+X2)/2\}/3$$

When the focus detecting position is S32 in FIG. 12B, $$\Delta E = \{(X5+X6)/2 - (X2+X3)/2\}/3$$

When the focus detecting position is S33 in FIG. 12B, $$\Delta E = \{(X6+X7)/2 - (X3+X4)/2\}/3$$

(156) Calculate a deviation ΔEs between the calculated average brightness value Ea(γ) corrected for high brightness and the brightness value Es at the focus detecting position.

$$\Delta Es = Ea(\gamma) - Es$$

Herein, Es is equal to E23 (when the focus detecting position is S31), E24 (when the focus detecting position is S32), or E25 (when the focus detecting position is S33).

(157) Discriminate whether or not the flash means 47 should be employed to photograph the scene. The condition for employing the flash means 47 to photograph the scene is either the first condition that the calculated average brightness value Ea(γ) corrected for high brightness is lower than a predetermined brightness (e.g., below 5 in Bv value) or the second condition that the calculated gradient value ΔE of brightness and the deviation ΔEs are positive with their relation being outside the line 82 as represented in FIG. 11 (hatched portion). When any of the gradient value ΔE of brightness and the deviation ΔEs is negative, the flash is not produced.

Also, when it is obvious that the distance to the subject is far and the excellent photographed results are not obtained with the light quantity of the provided flash means 47 as a result of focusing the photographing lens at step (105), the flash means 47 may not be employed, even if the first or second condition is satisfied. Also, when the camera is not in the photographing mode for automatically employing the flash means, it is unnecessary to perform this step. When it is discriminated that the flash means 47 should be employed to photograph the scene, the flash means 47 is prepared to produce the flash.

(158) Calculate the exposure compensation value α when a predetermined condition is satisfied.

When Ea(γ)>Es and the flash means is not employed as the condition, $$\alpha = \{Es - Ea(\gamma)\} \times 0.5.$$

When Ea(γ)<Es and Ea(γ)<0 as the condition, $$\alpha = \{Es - Ea(\gamma)\} \times 0.25$$

Under other conditions, α=0.

(159) Calculate the subject brightness value for exposure control as Ee=Ea(γ)+α. The optimal exposure control factors, namely the shutter speed and the stop value, are decided on the basis of the subject brightness value Ee and the presence or absence of employing the flash means 47 that is discriminated at step (157).

The description of the second embodiment is thus completed.

Though in the above embodiments the camera for reproducing images on the photographic film is employed, this invention is also applicable to a so-called video camera or electronic still camera in which the photoelectric conversion element such as CCD converts the image information in the field into electric signal which is then output or processed. When this invention is applied to the video camera or electronic still camera, the photometric sensor may not be specifically provided, in which the brightness information of the subject is acquired from the photoelectric conversion element for image pickup, and the acquired brightness information is converted into one-dimensional brightness data to discriminate the back light.

Further, in transforming two-dimensional brightness information into one-dimensional brightness information, it is well known that a method for reading out an output signal of the photoelectric conversion sensor having a plurality of photocells arranged in two dimensions and enabling the microcomputer to make the arithmetical operation on the output signal by software as described in the embodiments, and a method employing a processing circuit integrated on the same chip as the photoelectric conversion sensor to make the conversion by hardware are provided.

The present invention is not limited to the above embodiments and various changes and modifications can be made within the spirit and scope of the present invention. Therefore, to apprise the public of the scope of the present invention, the following claims are made.

What is claimed is:

1. A photometer comprising:
   a photometric sensor having a range corresponding to a field, said photometric sensor being two-dimensionally divided into plural areas and capable of metering each of the divided areas; and
   an arithmetical operation circuit adapted to calculate one-dimensional data from the outputs of said photometric sensor to detect the maximum value of said one-dimensional data, and calculating an exposure compensation value in accordance with the detected maximum value of said one-dimensional data, as well as an average brightness value of the subject, and adding said exposure compensation value and said average brightness value to acquire a correct brightness value.

2. The photometer according to claim 1, wherein said arithmetical operation circuit changes an operation area for performing an arithmetical operation on the one-dimensional data in accordance with a principal subject position or a focus detected position within a screen in calculating said one-dimensional data from the outputs of said photometric sensor.

3. The photometer according to claim 1, wherein said arithmetical operation circuit calculates the average brightness value over the screen by varying the weighting for each portion within the screen, and calculates the exposure compensation value in accordance with the detected maximum value of said one-dimensional data by changing a method for calculating the exposure compensation value in accordance with the position of the detected maximum value of said one-dimensional data within the screen and said weighting.

4. The photometer according to claim 1, wherein said one-dimensional data is obtained by adding and averaging plural pieces of brightness data divided in row and column direction within the screen in the row or column direction.

5. An image sensing device comprising:
   a recording medium adapted to receive a light from a subject;
   a photometric sensor having a range corresponding to a field, said photometric sensor being two-dimensionally divided into plural areas and capable of metering each of the divided areas;
   an arithmetical operation circuit adapted to calculate one-dimensional data from the outputs of said photometric sensor to detect the maximum value of said one-dimensional data, and calculating an exposure compensation value in accordance with the detected maximum value of said one-dimensional data, as well as an average brightness value of the subject, and adding said exposure compensation value and said average brightness value to acquire a correct brightness value; and
   a light control device adapted to control the quantity of light arriving to said recording medium in accordance with said correct brightness value.

6. An image sensing device comprising:
   a photoelectric conversion element adapted to receive a light from the field and outputting an electrical signal, said photoelectric conversion element being two-dimensionally divided into plural areas, and capable of outputting the electrical signal for each of the divided areas;
   an arithmetical operation circuit adapted to calculate one-dimensional data from the outputs of said photoelectric conversion element to detect the maximum value of said one-dimensional data, and calculating an exposure compensation value in accordance with the detected maximum value of said one-dimensional data, as well as an average brightness value of the subject, and adding said exposure compensation value and said average brightness value to acquire a correct brightness value; and
   a light control device adapted to control the quantity of light arriving to said photoelectric conversion element in accordance with said correct brightness value.

7. A photometric method comprising:
   a step of calculating one-dimensional data from the outputs of a photometric sensor having a range corresponding to a field, said photometric sensor being two-dimensionally divided into plural areas;
   a step of detecting the maximum value of said calculated one-dimensional data;
   a step of calculating an exposure compensation value in accordance with the detected maximum value of said one-dimensional data;
   a step of calculating an average brightness value over the field; and
   a step of adding said exposure compensation value and said average brightness value to acquire a correct brightness value.

8. The photometric method according to claim 7, wherein the step of calculating the one-dimensional data from the outputs of the photometric sensor comprises changing an operation area for calculating said one-dimensional data in accordance with a principal subject position or a focus detected position within the screen.

9. The photometric method according to claim 7, wherein the step of calculating the average brightness value over the screen comprises calculating the average brightness value over the screen by varying the weighting for each portion within the screen, and the step of calculating the exposure compensation value in accordance with the detected maximum value of the one-dimensional data comprises changing an operation method in accordance with the position of the detected maximum value of the detected one-dimensional data within the screen and said weighting.

10. The photometric method according to claim 7, wherein said one-dimensional data is obtained by adding and averaging the outputs of the photometric sensor, which is two-dimensionally divided into plural areas, in a row or column direction, an output being obtained for each area.

11. A program for causing a computer to perform a processing procedure for calculating a correct brightness value of a field to set up an incident light quantity upon a photoelectric conversion element, said program comprising:
   a process of calculating one-dimensional data from the outputs of a photometric sensor having a range corresponding to a field that is two-dimensionally divided into plural areas;
   a process of detecting the maximum value of said calculated one-dimensional data;
   a process of calculating an exposure compensation value in accordance with the detected maximum value of said one-dimensional data;
   a process of calculating an average-brightness value over the entire field; and
   a process of adding said exposure compensation value and said average brightness value to acquire a correct brightness value of the subject.

12. A computer readable recording medium for recording the program according to claim 11.

* * * * *

UNITED STATES PATENT AND TRADEMARK OFFICE
CERTIFICATE OF CORRECTION

| | |
|---|---|
| PATENT NO. | : 6,901,218 B2 |
| APPLICATION NO. | : 10/665756 |
| DATED | : May 31, 2005 |
| INVENTOR(S) | : Toshifumi Osawa |

It is certified that error appears in the above-identified patent and that said Letters Patent is hereby corrected as shown below:

Column 3, Line 20, delete "%".

Column 6, Line 66, change "+5" to --÷5--.

Column 6, Line 67, change "+5" to --÷5--.

Column 7, Line 1, change "+5" to --÷5--.

Column 7, Line 3, change "+5" to --÷5--.

Column 7, Line 5, change "+5" to --÷5--.

Column 7, Line 6, change "+5" to --÷5--.

Column 7, Line 8, change "+5" to --÷5--.

Column 7, Line 18, change "or." to --or--.

Column 7, Line 20, change "+5" to --÷5--.

Column 7, Line 22, change "+5" to --÷5--.

Column 7, Line 24, change "+5" to --÷5--.

Column 7, Line 25, Change "+5" to --÷5--.

Column 7, Line 27, change "+5" to --÷5--.

Column 7, Line 31, change "+5" to --÷5--.

Column 7, Line 33, change "+5" to --÷5--.

Column 7, Line 35, change "+5" to --÷5--.

Column 7, Line 37, change "+5" to --÷5--.

Column 7, Line 39, change "+5" to --÷5--.

Column 7, Line 43, change "+5" to --÷5--.

UNITED STATES PATENT AND TRADEMARK OFFICE
CERTIFICATE OF CORRECTION

PATENT NO.        : 6,901,218 B2
APPLICATION NO.   : 10/665756
DATED             : May 31, 2005
INVENTOR(S)       : Toshifumi Osawa It is certified that error appears in the above-identified patent and that said Letters Patent is hereby corrected as shown below:

Column 7, Line 45, change "+5" to --÷5--.

Column 7, Line 47, change "+5" to --÷5--.

Column 7, Line 49, change "+5" to --÷5--.

Column 7, Line 50, change "+5" to --÷5--.

Column 7, Line 53, change "from, the" to --from the--.

Column 7, Line 59, change "+35" to --÷35--.

Column 7, Line 63, change "+35" to --÷35--.

Column 7, Line 66, change "+35" to --÷35--.

Column 8, Line 3, change "+35" to --÷35--.

Column 8, Line 6, change "+35" to --÷35--.

Column 8, Line 9, change "+35" to --÷35--.

Column 8, Line 13, change "+35" to --÷35--.

Column 8, Line 16, change "+35" to --÷35--.

Column 8, Line 20, change "+35" to --÷35--.

Column 9, Line 15, change "E" to --ΔE--.

Column 9, Line 59, change "yEs" to --ΔEs--.

Column 11, Line 34, change "+4" to --÷4--.

Column 11, Line 36, change "+10" to --÷10--.

Column 11, Line 38, change "+10" to --÷10--.

Column 11, Line 40, change "+10" to --÷10--.

UNITED STATES PATENT AND TRADEMARK OFFICE
CERTIFICATE OF CORRECTION

PATENT NO.        : 6,901,218 B2
APPLICATION NO. : 10/665756
DATED              : May 31, 2005
INVENTOR(S)      : Toshifumi Osawa It is certified that error appears in the above-identified patent and that said Letters Patent is hereby corrected as shown below:

Column 11, Line 42, change "+10" to --÷10--.

Column 11, Line 44, change "+10" to --÷10--.

Column 11, Line 45, change "+4" to --÷4--.

Column 11, Line 56, change "+5" to --÷5--.

Column 11, Line 57, change "+5" to --÷5--.

Column 11, Line 58, change "+5" to --÷5--.

Column 11, Line 60, change "+5" to --÷5--.

Column 11, Line 62, change "+5" to --÷5--.

Column 11, Line 65, change "+5" to --÷5--.

Column 11, Line 67, change "+5" to --÷5--.

Column 12, Line 1, change "+5" to --÷5--.

Column 12, Line 2, change "+5" to --÷5--.

Column 12, Line 4, change "+5" to --÷5--.

Column 12, Line 7, change "+5" to --÷5--.

Column 12, Line 9, change "+5" to --÷5--.

Column 12, Line 11, change "+5" to --÷5--.

Column 12, Line 12, change "+5" to --÷5--.

Column 12, Line 14, change "+5" to --÷5--.

Column 12, Line 23, change "+29" to --÷29--.

Column 12, Line 26, change "+29" to --÷29--.

UNITED STATES PATENT AND TRADEMARK OFFICE
CERTIFICATE OF CORRECTION

| | |
|---|---|
| PATENT NO. | : 6,901,218 B2 |
| APPLICATION NO. | : 10/665756 |
| DATED | : May 31, 2005 |
| INVENTOR(S) | : Toshifumi Osawa |

It is certified that error appears in the above-identified patent and that said Letters Patent is hereby corrected as shown below:

Column 12, Line 29, change "+29" to --÷29--.

Column 14, Line 3, change "a" to --α--.

Signed and Sealed this

Twentieth Day of November, 2007

JON W. DUDAS
*Director of the United States Patent and Trademark Office*